(12) United States Patent
Onodera

(10) Patent No.: US 11,390,227 B2
(45) Date of Patent: Jul. 19, 2022

(54) WIRE PROTECTOR HAVING REGULATION BELT

(71) Applicant: SUMITOMO WIRING SYSTEMS, LTD., Mie (JP)

(72) Inventor: Kota Onodera, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 42 days.

(21) Appl. No.: 17/070,386

(22) Filed: Oct. 14, 2020

(65) Prior Publication Data

US 2021/0122306 A1 Apr. 29, 2021

(30) Foreign Application Priority Data

Oct. 29, 2019 (JP) .............................. JP2019-196262

(51) Int. Cl.
*B60R 16/02* (2006.01)
*H02G 3/04* (2006.01)

(52) U.S. Cl.
CPC ....... *B60R 16/0215* (2013.01); *H02G 3/0406* (2013.01)

(58) Field of Classification Search
CPC .......................... B60R 16/0215; H02G 3/0406
USPC ........................................................... 174/95
See application file for complete search history.

(56) References Cited

U.S. PATENT DOCUMENTS

| 5,500,179 A | * | 3/1996 | Onishi | .................... B29C 49/20 |
| | | | | 264/516 |
| 2019/0375347 A1 | * | 12/2019 | Kotani | ................. H02G 3/0418 |

FOREIGN PATENT DOCUMENTS

JP 2014-064429 A 4/2014

* cited by examiner

*Primary Examiner* — Timothy J Thompson
*Assistant Examiner* — Michael F McAllister
(74) *Attorney, Agent, or Firm* — Venjuris, P.C.

(57) ABSTRACT

A protector includes an accommodating portion. The accommodating portion includes a bottom wall portion, a pair of side wall portions that extend from the bottom wall portion, and an opening that is open in a direction opposing to the bottom wall portion, the accommodating portion being capable of accommodating an electric wire therein. The protector further includes a regulation belt portion that is provided as an article integrally molded with the side wall portion, which is one of the pair of side wall portions, and that regulates movement of the electric wire to the outside from the opening, and a belt fastening portion that is arranged at the side wall portion, which is the other of the pair of side wall portions, and that fastens the regulation belt portion in a state in which the regulation belt portion spans between the pair of side wall portions.

8 Claims, 9 Drawing Sheets

WIRE PROTECTOR HAVING REGULATION BELT

CROSS-REFERENCE TO RELATED APPLICATIONS

This application is based on and claims priority from Japanese Patent Application No. 2019-196262, filed on Oct. 29, 2019, with the Japan Patent Office, the disclosure of which is incorporated herein in their entireties by reference.

TECHNICAL FIELD

The present disclosure relates to a protector.

BACKGROUND

Conventionally, there are techniques in which electric wires routed in vehicles such as automobiles are accommodated in protectors so that the electric wires are protected and the routes of the electric wires are regulated (See, for example, Japanese Patent Laid-Open Publication No. 2014-064429). The protector of Japanese Patent Laid-Open Publication No. 2014-064429 includes a semi-tubular accommodating portion that has an opening defined by a bottom wall portion and side wall portions provided on the bottom wall portion, and a cover portion that covers the opening of the accommodating portion.

SUMMARY

Incidentally, in this sort of protector, when thick electric wires or rigid electric wires are accommodated in the semi-tubular accommodating portion, the electric wires may project from the opening of the accommodating portion, which makes it difficult to attach the cover portion to the accommodating portion. Furthermore, regardless of whether or not the cover portion is to be attached, when the electric wires project from the opening of the accommodating portion, the electric wires may come into contact with other members and be damaged.

It is an object of the present disclosure to provide a protector in which projection of electric wires from an accommodating portion can be suppressed.

The present disclosure is directed to a protector including: an accommodating portion including a bottom wall portion, a pair of side wall portions that extend from the bottom wall portion, and an opening that is open in a direction opposing to the bottom wall portion, the accommodating portion being capable of accommodating an electric wire therein; a regulation belt portion that is provided as an article integrally molded with one of the pair of side wall portions, and that regulates movement of the electric wire to an outside from the opening; and a belt fastening portion that is arranged at another of the pair of side wall portions, and that fastens the regulation belt portion in a state in which the regulation belt portion spans between the pair of side wall portions.

According to the protector of the present disclosure, it is possible to suppress projection of electric wires from an accommodating portion.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
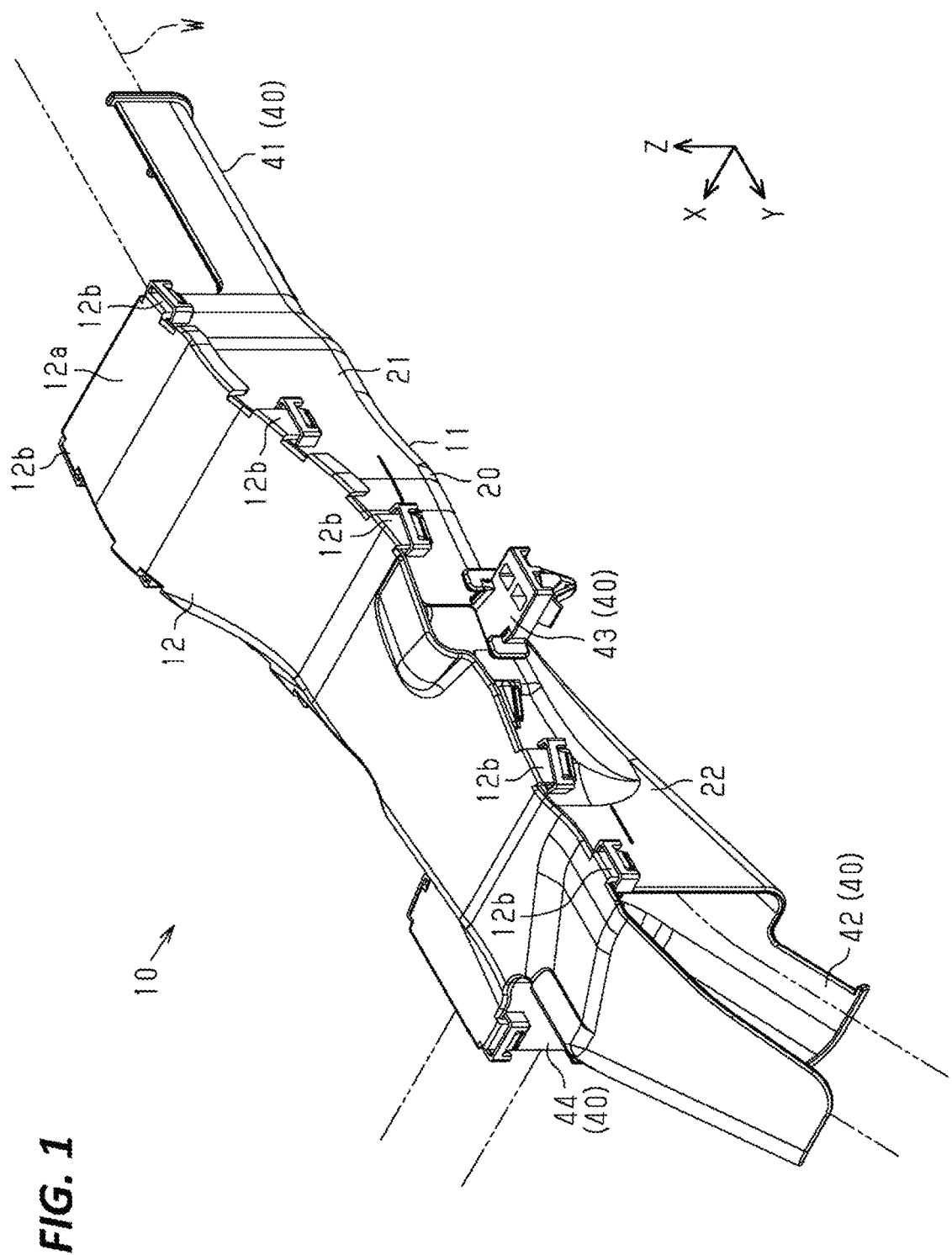
FIG. 1 is a perspective view of a protector according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

[1] The present disclosure is directed to a protector including: an accommodating portion including a bottom wall portion, a pair of side wall portions that extend from the bottom wall portion, and an opening that is open in a direction opposing to the bottom wall portion, the accommodating portion being capable of accommodating an electric wire therein; a regulation belt portion that is provided as an article integrally molded with one of the pair of side wall portions, and that regulates movement of the electric wire to an outside from the opening; and a belt fastening portion that is arranged at another of the pair of side wall portions, and that fastens the regulation belt portion in a state in which the regulation belt portion spans between the pair of side wall portions.

With this configuration, since the regulation belt portion that is provided as an integrally molded article can be fastened by the belt fastening portion in a state in which the regulation belt portion spans between the pair of side wall portions, it is possible to suppress projection of the electric wire to the outside from the opening. Furthermore, since the regulation belt portion is an article integrally molded with the side wall portion, it is possible to suppress an increase in the number of parts and further suppress the loss of parts.

[2] It is preferable that the belt fastening portion fastens the regulation belt portion at one point.

With this configuration, since the regulation belt portion is fastened by the belt fastening portion at one point, that is, the number of fastening points is smaller than that in the case in which the regulation belt portion is fastened at a plurality of points, it is easy to perform the attachment operation.

[3] It is preferable that the one of the pair of side wall portions includes a first wall portion whose end in an opening direction is provided with the regulation belt portion, and a second wall portion that is adjacent to the first wall portion in a direction in which the accommodating portion extends, the other of the pair of side wall portions includes a third wall portion whose end in the opening direction is provided with the belt fastening portion, and a fourth wall portion that is adjacent to the third wall portion in the direction in which the accommodating portion extends, the end in the opening direction of the first wall portion is lower than an end in the opening direction of the second wall portion, and the end in the opening direction of the third wall portion is lower than an end in the opening direction of the fourth wall portion.

With this configuration, since the end in the opening direction of the first wall portion at which the regulation belt portion is arranged is lower than the end in the opening direction of the second wall portion that is adjacent to the first wall portion, even when the regulation belt portion is provided at the end in the opening direction of the first wall portion, it is possible to suppress excessive projection thereof from the adjacent second wall portion. Furthermore, since the end in the opening direction of the third wall portion at which the belt fastening portion is arranged is lower than the end in the opening direction of the fourth wall portion that is adjacent to the third wall portion, even when the belt fastening portion is provided at the end in the opening direction of the third wall portion, it is possible to suppress excessive projection thereof from the adjacent fourth wall portion.

[4] It is preferable that the protector further includes a cover portion that covers the opening, wherein the regulation belt portion regulates movement of the electric wire to the outside from the opening, at a position that is closer to the bottom wall portion than the cover portion is.

With this configuration, since the regulation belt portion regulates movement of the electric wire to the outside from the opening, at a position that is closer to the bottom wall portion than the cover portion is. That is to say, when attaching the cover portion to the accommodating portion, the regulation belt portion regulates movement of the electric wire to the outside from the opening. Accordingly, it is possible to suppress contact of the electric wire and the cover portion when attaching the cover portion to the accommodating portion. Thus, it is possible to suppress deterioration of the attachment operation efficiency of the cover portion.

[5] It is preferable that the accommodating portion includes a lock portion that fastens the cover portion, and the belt fastening portion is arranged at a position that is away from the lock portion in a direction in which the accommodating portion extends.

With this configuration, since the belt fastening portion is arranged at a position that is away from the lock portion that fastens the cover portion, it is possible to suppress contact of the lock portion and the regulation belt portion when fastening the regulation belt portion with the belt fastening portion.

[6] It is preferable that the accommodating portion includes a first accommodating member in which the bottom wall portion is along a horizontal direction in a state in which the accommodating portion is attached to a vehicle, and a second accommodating member that is continuous from the first accommodating member, and in which the bottom wall portion thereof is positioned lower than the bottom wall portion of the first accommodating member with increasing distance from the first accommodating member in a state in which the accommodating portion is attached to the vehicle, and the regulation belt portion and the belt fastening portion are arranged at the side wall portions of the second accommodating member.

The electric wire is arranged so as to extend through a first accommodating member in which the bottom wall portion is along the horizontal direction, and a second accommodating member in which the bottom wall portion becomes lower with increasing distance from the first accommodating member. For example, if the electric wire has high rigidity due to the electric wire being thick or being constituted by bundling a plurality of electric wires, for example, that is, if the electric wire is unlikely to be warped, the electric wire cannot follow the change from the bottom wall portion of the first accommodating member to the bottom wall portion of the second accommodating member, and is likely to be separated from the bottom wall portion of the second accommodating member. That is to say, the electric wire is likely to be positioned near the opening in the second accommodating member. That is to say, the electric wire is likely to project to the outside from the opening in the second accommodating member. Thus, if the regulation belt portion and the belt fastening portion are arranged at the side wall portions of the second accommodating member from which the electric wire is likely to project, it is possible to regulate the projection of the electric wire.

[7] It is preferable that the accommodating portion includes a narrow portion in which an accommodation space for accommodating the electric wire is narrower than that of other portions in a direction in which the accommodating portion extends, and the regulation belt portion and the belt fastening portion are arranged at the side wall portions corresponding to the narrow portion.

Since the narrow portion is included in the accommodating portion, the electric wire positioned in the narrow portion is likely to be positioned near the opening compared with the electric wire positioned in the accommodating portion other than the narrow portion. That is to say, the electric wire is likely to project to the outside from the opening in the narrow portion. Thus, if the regulation belt portion and the belt fastening portion are arranged at the side wall portions corresponding to the narrow portion from which the electric wire is likely to project, it is possible to more reliably regulate the projection of the electric wire.

[8] It is preferable that the regulation belt portion and the belt fastening portion are arranged in a middle in a direction in which the accommodating portion extends.

With this configuration, since the regulation belt portion and the belt fastening portion are arranged in the middle in the direction in which the accommodating portion extends, it is possible to reliably regulate the electric wire accommodated in the accommodating portion.

DETAILS OF EMBODIMENTS OF THE PRESENT DISCLOSURE

Hereinafter, specific examples of the protector according to the present disclosure will be described with reference to the drawings. In the drawings, parts of configurations are shown exaggerated or simplified in some cases for convenience of description. Also, dimensional proportions of the portions may be different between the drawings. Being "parallel" or "orthogonal" as used herein includes not only being exactly parallel or orthogonal, but also being substantially parallel or orthogonal, as long as the operations and effects of the present embodiment can be achieved. It should be noted that the present invention is not limited to these examples, and is intended to include all modifications which fall within the scope of the claims and the meaning and scope of equivalents thereof.

The protector is mounted in a vehicle, for example, and accommodates and protects electric wires for the vehicle.

As shown in FIG. 1, a protector 10 includes a main portion 11 and a cover portion 12. The main portion 11 and the cover portion 12 are both resin molded articles. Furthermore, the main portion 11 and the cover portion 12 are separately molded articles. The cover portion 12 includes a plate-like cover main portion 12a and a plurality of lock catch portions 12b that are to be interlocked with the main portion 11. In the description below, the width direction of the main portion 11 is referred to as a width direction X, and the length direction of the main portion 11 is referred to as a length direction Y. Furthermore, a direction that is orthogonal to both of the width direction X and the length direction Y is referred to as a height direction Z. Note that the height direction Z is a direction that is parallel to the vertical direction in a state in which the protector 10 is attached to a vehicle, and the direction indicated by the arrow Z in FIG. 1 is indicated as the upper direction.

(Configuration of Main Portion 11)

Figure 2:
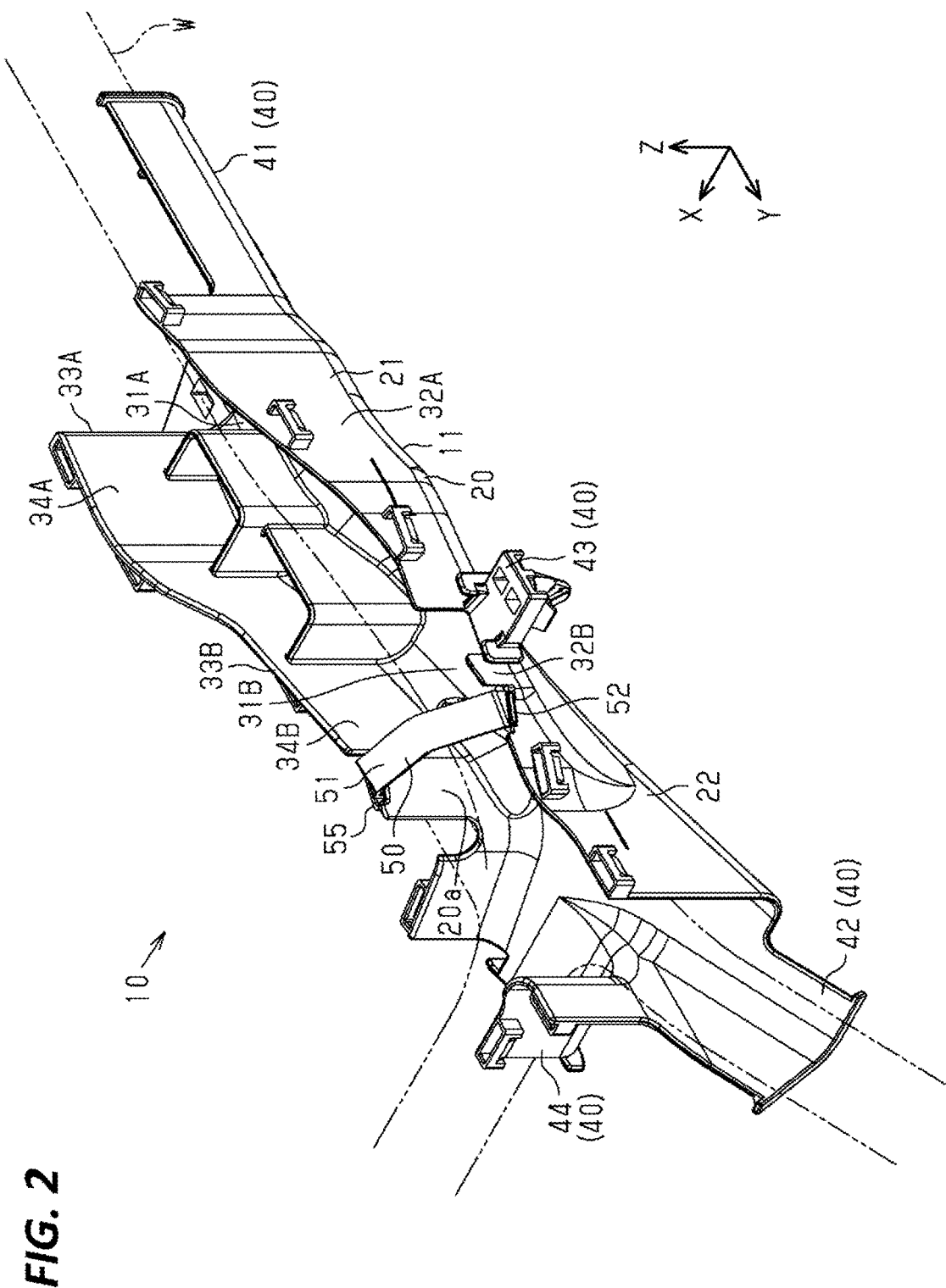
FIG. 2 is a perspective view showing a state in which a cover portion of the protector according to the embodiment is detached.
Figure 3:
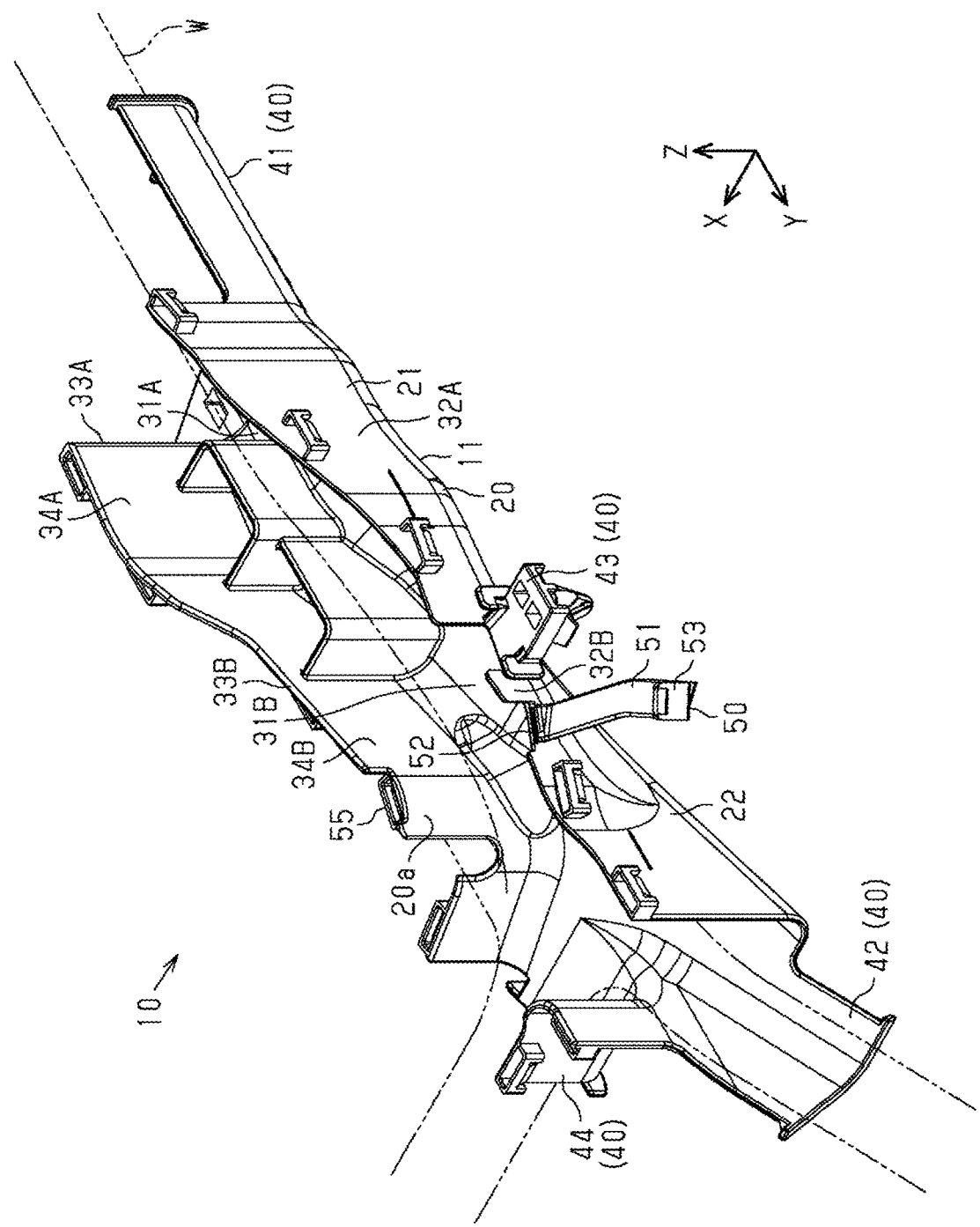
FIG. 3 is a perspective view showing a state in which the cover portion of the protector according to the embodiment is detached.

As shown in FIGS. 1, 2, and 3, the main portion 11 includes an accommodating portion 20 that accommodates electric wires W, and a plurality of guiding portions 40.

(Configuration of Accommodating Portion 20)

Figure 4:
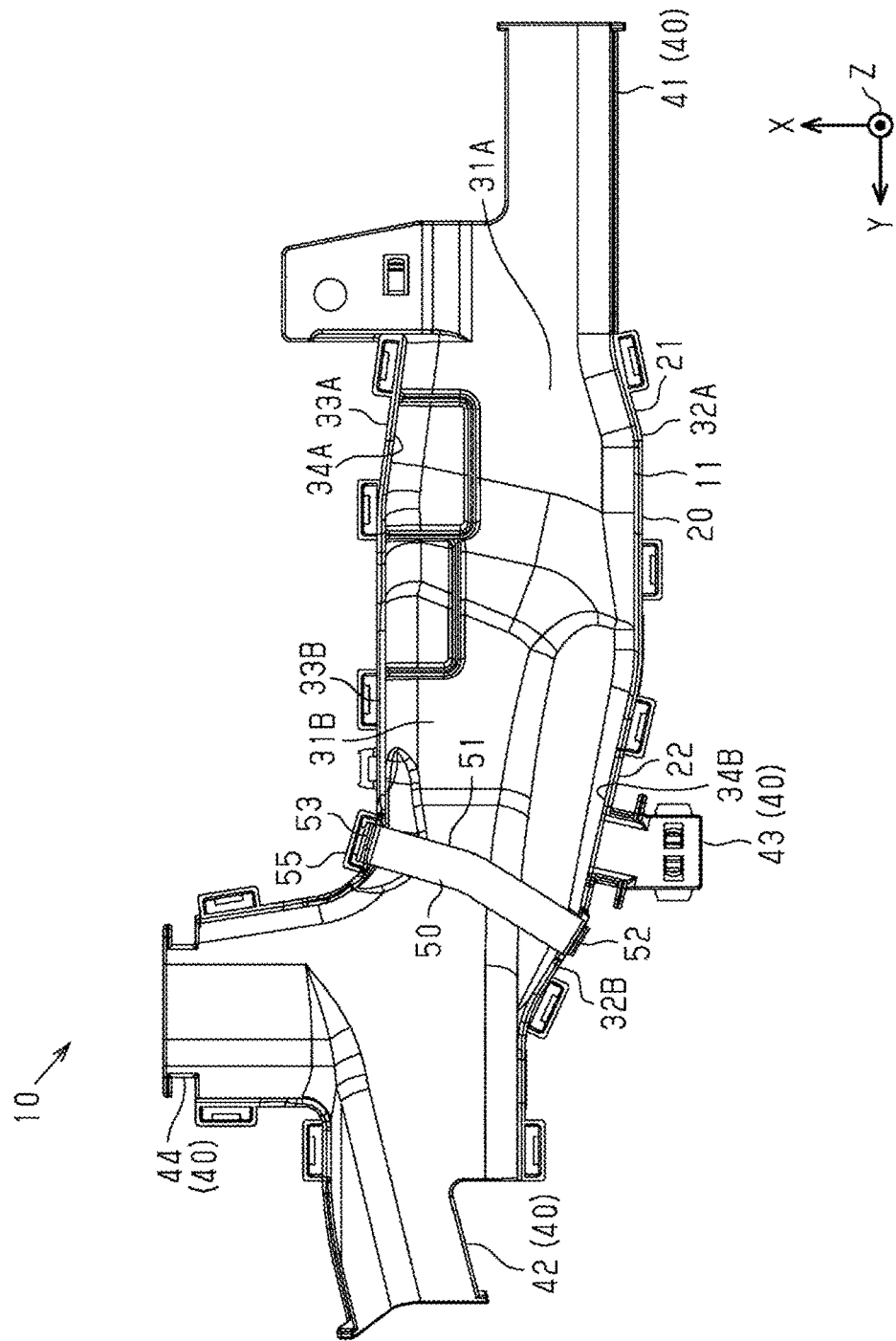
FIG. 4 is a top view showing a state in which the cover portion of the protector according to the embodiment is detached.

As shown in FIGS. 2, 3, and 4, the accommodating portion 20 includes a first accommodating member 21, and a second accommodating member 22 that is continuous from the first accommodating member 21. The first accommodating member 21 and the second accommodating member 22 respectively include bottom wall portions 31A and 31B, pairs of side wall portions 32A and 33A, and 32B and 33B that extend from the bottom wall portions 31A and 31B, and openings 34A and 34B that are open in a direction opposing to the bottom wall portions 31A and 31B. The first accommodating member 21 constituting the accommodating portion 20 is formed in the semi-tubular shape defined by the bottom wall portion 31A and the pair of side wall portions 32A and 33A. The second accommodating member 22 constituting the accommodating portion 20 is formed in the semi-tubular shape defined by the bottom wall portion 31B and the pair of side wall portions 32B and 33B.

The bottom wall portions 31A and 31B include a first bottom wall portion 31A of the first accommodating member 21 and a second bottom wall portion 31B of the second accommodating member 22.

Figure 5:
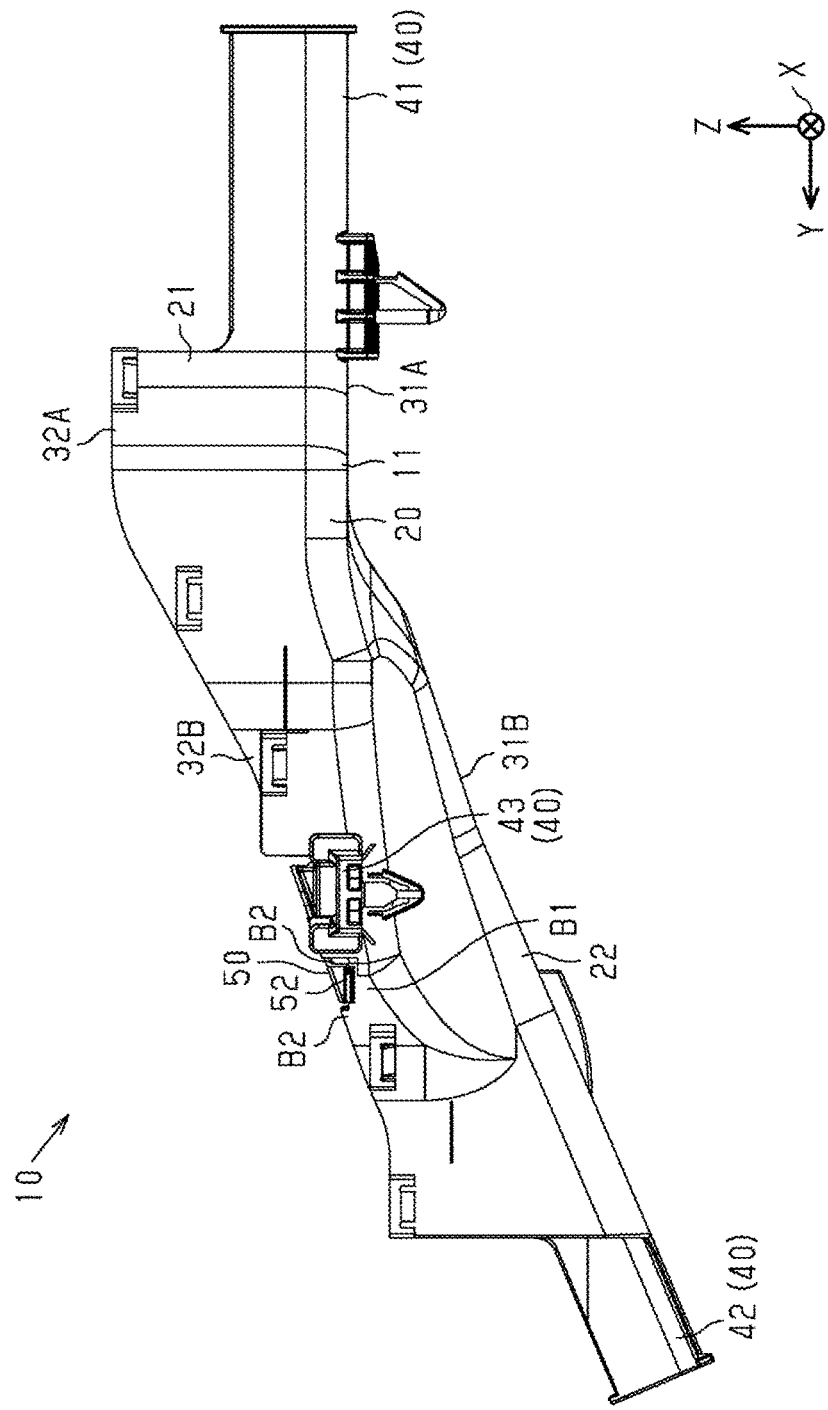
FIG. 5 is a front view showing a state in which the cover portion of the protector according to the embodiment is detached.
Figure 6:
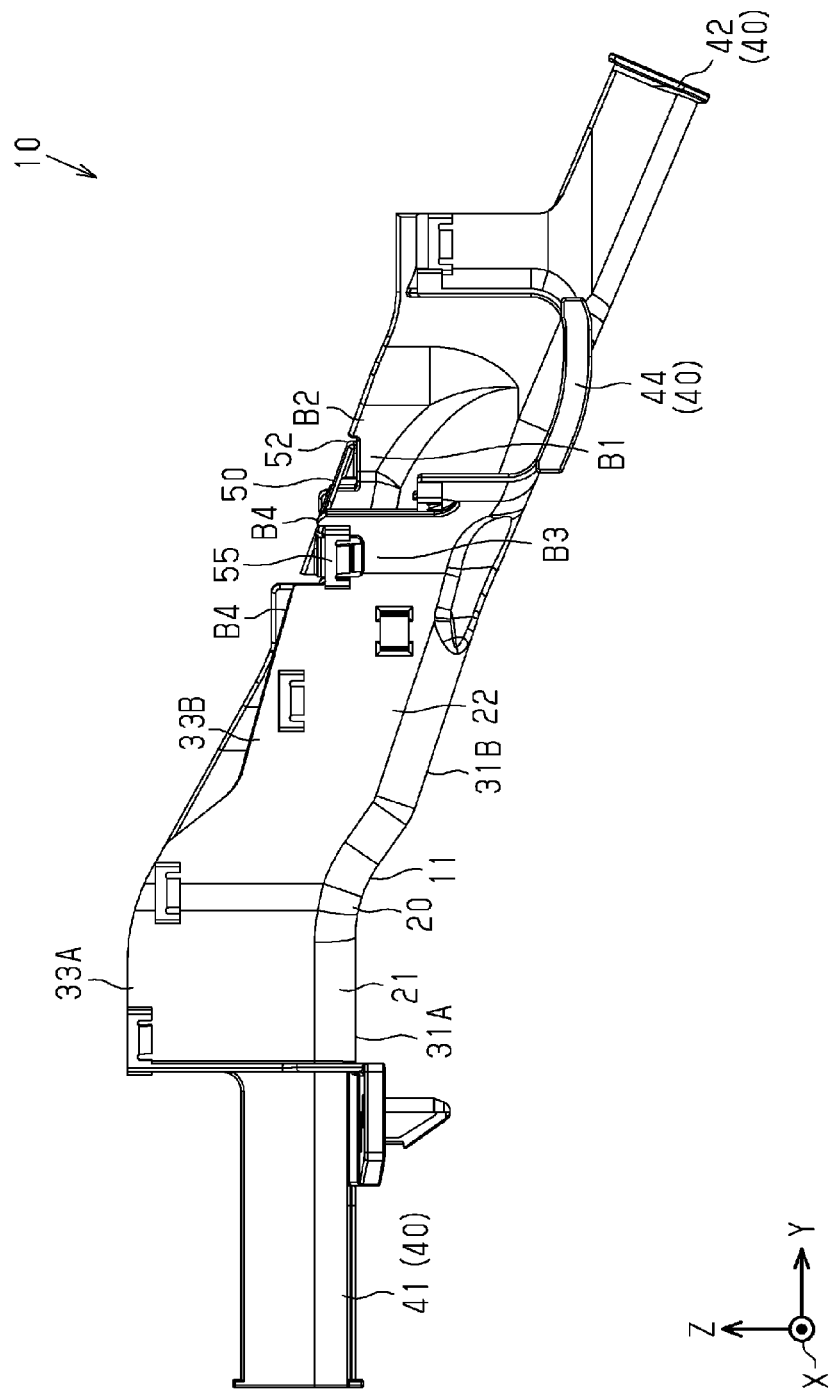
FIG. 6 is a rear view showing a state in which the cover portion of the protector according to the embodiment is detached.
Figure 9:
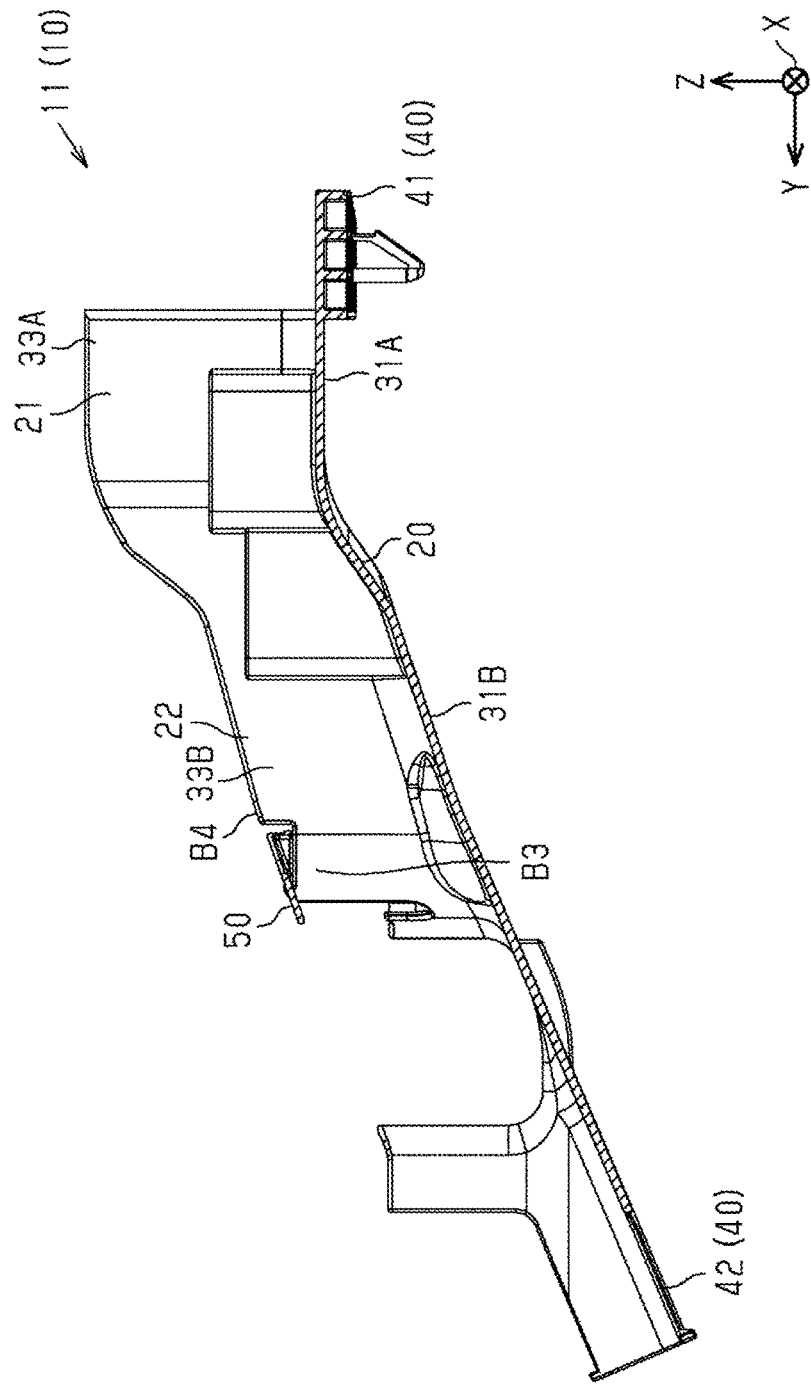
FIG. 9 is a cross-sectional view showing a state in which the cover portion of the protector according to the embodiment is detached.

As shown in FIGS. 5, 6, and 9, the first bottom wall portion 31A is formed in the flat plate shape along the horizontal direction in a state in which the protector 10 is mounted in a vehicle. The second bottom wall portion 31B is continuous from the first bottom wall portion 31A, and is formed in the flat plate shape on the whole inclined with respect to the first bottom wall portion 31A in a state in which the protector 10 is mounted in a vehicle. That is to say, the second bottom wall portion 31B is inclined with respect to the horizontal direction in a state in which the protector 10 is mounted in the vehicle.

As shown in FIGS. 2, 3, and 4, the pair of side wall portions 32A and 33A of the first accommodating member 21 include a side wall portion 32A arranged along a side edge on one side in the width direction X of the first bottom wall portion 31A, and a side wall portion 33A arranged along a side edge on the other side in the width direction X of the first bottom wall portion 31A. The pair of side wall portions 32A and 33A are formed so as to extend upward in the height direction Z from the first bottom wall portion 31A.

The pair of side wall portions 32B and 33B of the second accommodating member 22 include a side wall portion 32B arranged along a side edge on one side in the width direction X of the second bottom wall portion 31B, and a side wall portion 33B arranged along a side edge on the other side in the width direction X of the second bottom wall portion 31B. The pair of side wall portions 32B and 33B are formed so as to extend upward in the height direction Z from the second bottom wall portion 31B. The side wall portion 32B is continuous from the side wall portion 32A in the length direction Y. The side wall portion 33B is continuous from the side wall portion 32B in the length direction Y.

As shown in FIG. 6, the positions of the upper ends in the height direction Z of the side wall portion 33A and the side wall portion 33B change in accordance with the first bottom wall portion 31A and the second bottom wall portion 31B. Specifically, the upper end of the side wall portion 33B is positioned lower than the upper end of the side wall portion 33A in a state in which the protector 10 is mounted in a vehicle.

As shown in FIG. 5, the positions of the upper ends in the height direction Z of the side wall portion 32A and the side wall portion 32B change in accordance with the first bottom wall portion 31A and the second bottom wall portion 31B. Specifically, the upper end of the side wall portion 32B is positioned lower than the upper end of the side wall portion 32A in a state in which the protector 10 is mounted in a vehicle.

(Configuration of Guide Portions 40)

As shown in FIGS. 2 and 3, the guiding portions 40 include an end guiding portion 41 arranged at an end on one side in the length direction Y that is a direction in which the accommodating portion 20 extends, and an end guiding portion 42 arranged at an end on the other side in the length direction Y that is a direction in which the accommodating portion 20 extends. Furthermore, the guiding portions 40 include an intermediate guiding portion 43 arranged at the side wall portion 32B of the accommodating portion 20, and an intermediate guiding portion 44 arranged at the side wall portion 33B of the accommodating portion 20. The guiding portions 41, 42, 43, and 44 are held together with the electric wires W with a wind tape or a cable tie, thereby regulating the direction for guiding the electric wires.

As shown in FIGS. 2 and 3, the accommodating portion 20 of this embodiment includes a regulation belt portion 50 and a belt fastening portion 55.

(Configuration of Regulation Belt Portion 50)

As shown in FIGS. 2 to 8, the regulation belt portion 50 is arranged at the side wall portion 32B of the second accommodating member 22. The regulation belt portion 50 includes a belt main portion 51, a hinge portion 52 that connects the belt main portion 51 to the upper end of the side wall portion 32B, and an interlock piece 53 that is interlocked with the belt fastening portion 55.

The belt main portion 51 is formed in the plate shape elongated in the width direction X. The base end of the belt main portion 51 is provided with the hinge portion 52. The front end of the belt main portion 51 is provided with the interlock piece 53. The regulation belt portion 50 of this embodiment is integrally molded with the accommodating portion 20.

Hereinafter, the side wall portion 32B of the second accommodating member 22 at which the regulation belt portion 50 is arranged will be described in detail. In the description below, for the sake of ease of description, as shown in FIGS. 5 to 8, a portion of the side wall portion 32B whose end in the opening direction is provided with the regulation belt portion 50 is referred to as a first wall portion B1, and a portion of the side wall portion 32B that is adjacent to the first wall portion B1 in the direction in which the accommodating portion 20 extends is referred to as a second wall portion B2.

As shown in FIGS. 5 to 8, in the side wall portion 32B, the end in the opening direction of the first wall portion B1 at which the regulation belt portion 50 is arranged is positioned lower in the height direction Z than the end in the opening direction of the second wall portion B2 that is adjacent to the first wall portion B1. Accordingly, even when the end in the opening direction of the first wall portion B1 is provided with the hinge portion 52, excessive projection of the hinge portion 52 from the second wall portion B2 is suppressed.

(Configuration of Belt Fastening Portion 55)

As shown in FIGS. 2 to 8, the belt fastening portion 55 is arranged at the side wall portion 33B of the second accommodating member 22. The belt fastening portion 55 is formed in the shape of a frame with a U-shaped cross-section that can be engaged with the interlock piece 53.

Hereinafter, the side wall portion 33B of the second accommodating member 22 at which the belt fastening portion 55 is arranged will be described in detail. In the description below, for the sake of ease of description, as shown in FIGS. 6 to 8, a portion of the side wall portion 33B whose end in the opening direction is provided with the belt fastening portion 55 is referred to as a third wall portion B3, and a portion of the side wall portion 33B that is adjacent to the third wall portion B3 in the direction in which the accommodating portion 20 extends is referred to as a fourth wall portion B4.

Figure 7:
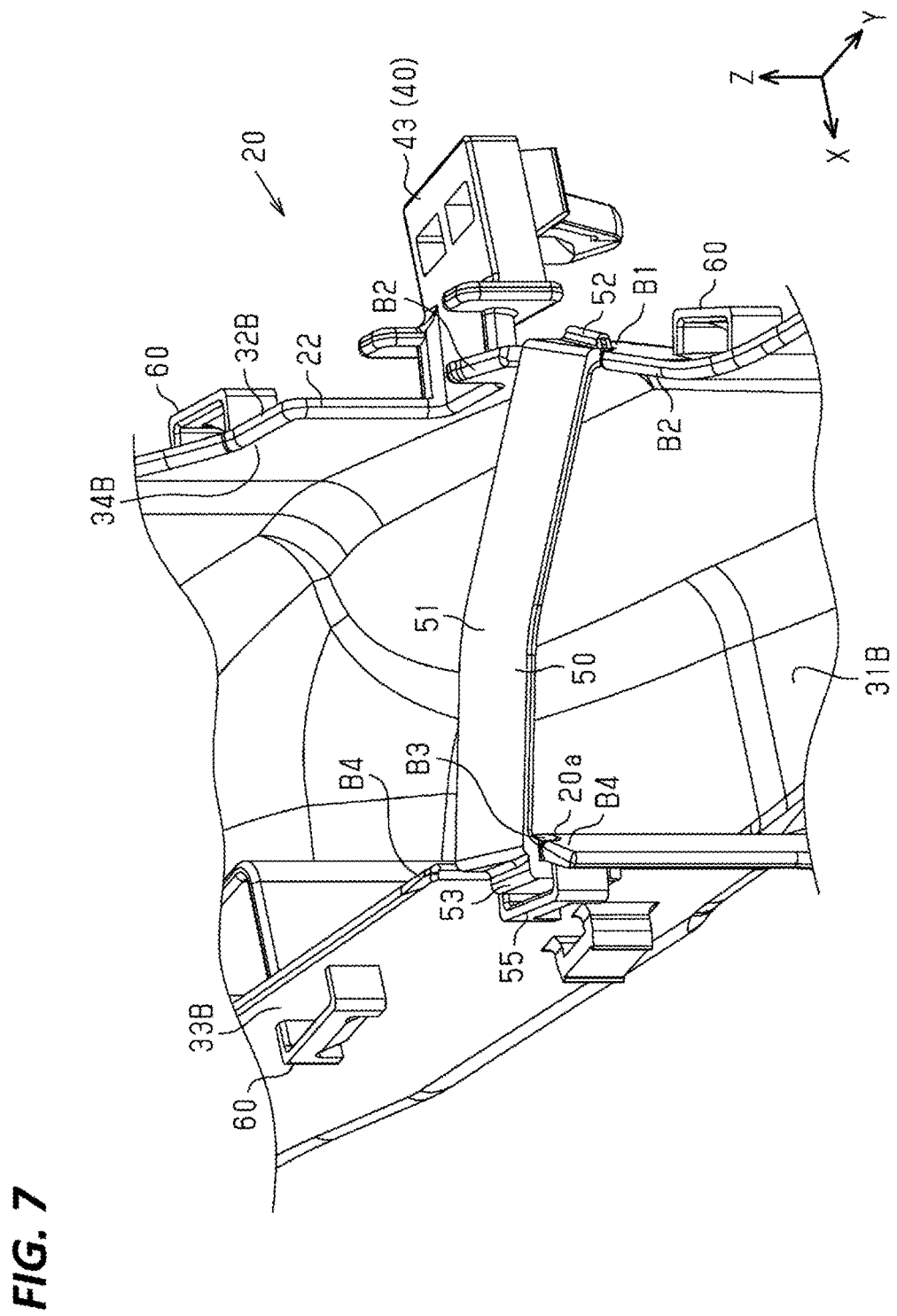
FIG. 7 is a perspective view showing a state in which a regulation belt portion according to the embodiment is closed.
Figure 8:
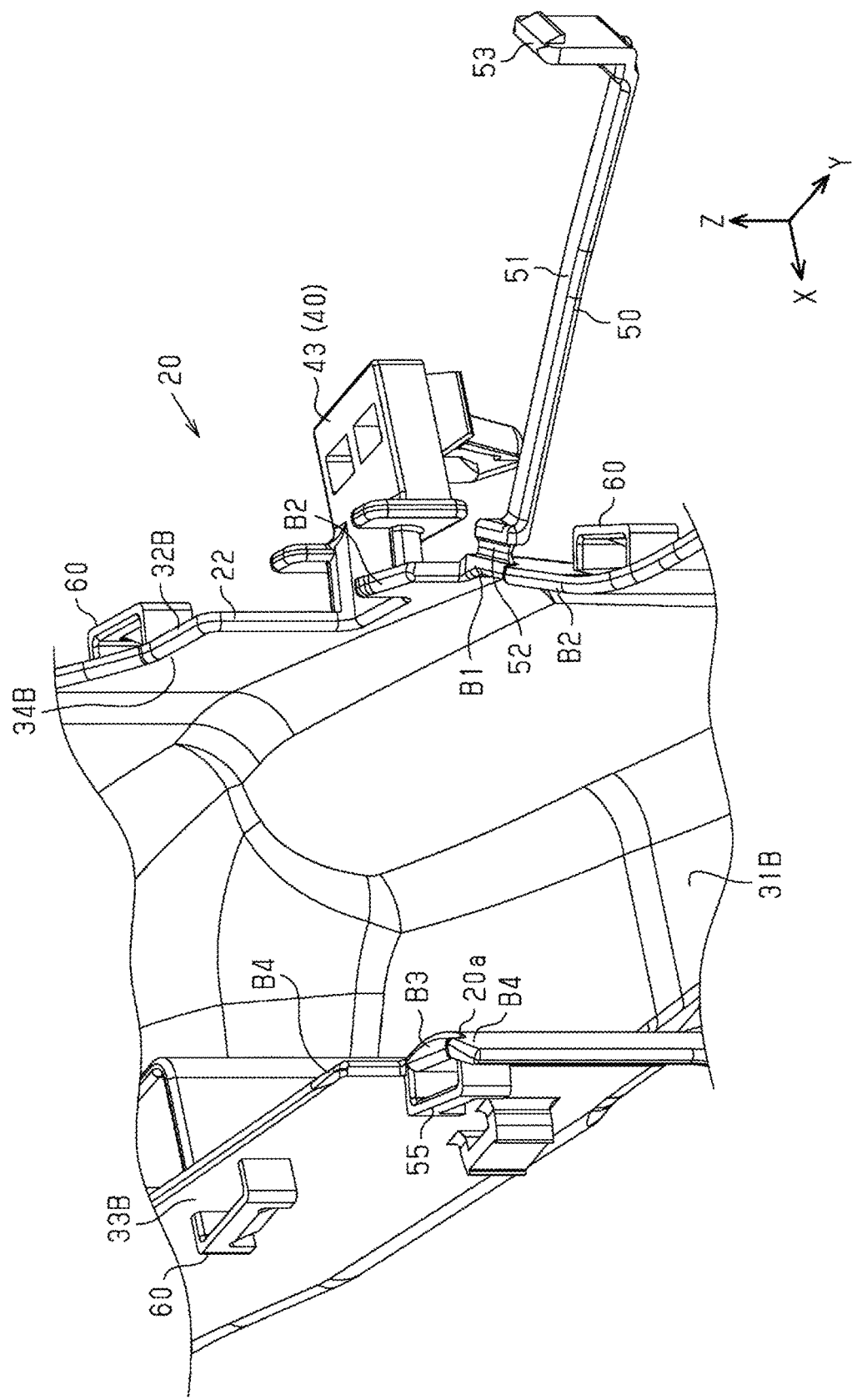
FIG. 8 is a perspective view showing a state in which the regulation belt portion according to the embodiment is open.

As shown in FIGS. 6 to 8, in the side wall portion 33B, the end in the opening direction of the third wall portion B3 at which the belt fastening portion 55 is arranged is positioned lower than the end in the opening direction of the fourth wall portion B4. Accordingly, even when the end in the opening direction of the third wall portion B3 is provided with the belt fastening portion 55, excessive projection of the belt fastening portion 55 from the fourth wall portion B4 is suppressed. Furthermore, in a state in which the regulation belt portion 50 spans over the side wall portion 33B at which the belt fastening portion 55 is arranged, excessive projection of the regulation belt portion 50 from the fourth wall portion B4 is suppressed.

The regulation belt portion 50 and the belt fastening portion 55 with the above-described configuration is arranged in the middle in the length direction Y that is a direction in which the accommodating portion 20 extends. More specifically, the regulation belt portion 50 and the belt fastening portion 55 are arranged at a narrow portion 20a in which an accommodation space for accommodating the electric wires W is narrower than that of other portions in the length direction Y that is a direction in which the accommodating portion 20 extends.

(Configuration of Cover Portion 12)

As shown in FIG. 1, the cover portion 12 includes a cover main portion 12a, and a plurality of lock catch portions 12b that are arranged at the two side edges in the width direction X of the cover main portion 12a.

The cover main portion 12a is configured to close the openings 34A and 34B of the accommodating portion 20. The lock catch portions 12b engage with lock frame portions 60 that are formed at the pairs of side wall portions 32A and 33A, and 32B and 33B, so that the openings 34A and 34B of the accommodating portion 20 are kept closed by the cover portion 12. At this time, the regulation belt portion 50 regulates movement of the electric wires W to the outside from the openings 34A and 34B, at a position that is closer to the bottom wall portion 31B than the cover portion 12 is, that is, that is lower than the cover portion 12. Furthermore, the belt fastening portion 55 is arranged at a position that is away from the lock frame portions 60, which are lock portions, in the length direction Y that is a direction in which the accommodating portion 20 extends.

Hereinafter, the actions of this embodiment will be described.

The protector 10 of this embodiment is configured such that the accommodating portion 20 accommodates the electric wires W. The regulation belt portion 50 that is provided as an article integrally molded with the accommodating portion 20 and the belt fastening portion 55 are arranged at the accommodating portion 20. The regulation belt portion 50 is fastened to the belt fastening portion 55 after the electric wires W are accommodated in the accommodating portion 20, thereby regulating movement of the electric wires W to the outside from the opening 34B.

Hereinafter, the effects of this embodiment will be described.

(1) Since the regulation belt portion 50 that is provided as an integrally molded article can be fastened by the belt fastening portion 55 in a state in which the regulation belt portion 50 spans between the pair of side wall portions 32B and 33B, it is possible to suppress projection of the electric wires W to the outside from the opening 34B. Furthermore, since the regulation belt portion 50 is an article integrally molded with the side wall portion 32B, it is possible to suppress an increase in the number of parts and further suppress the loss of parts.

(2) Since the regulation belt portion 50 is fastened by the belt fastening portion 55 at one point, that is, the number of fastening points is smaller than that in the case in which the regulation belt portion 50 is fastened at a plurality of points, it is easy to perform the attachment operation.

(3) Since the end in the opening direction of the first wall portion B1 at which the regulation belt portion 50 is arranged is lower than the end in the opening direction of the second wall portion B2 that is adjacent to the first wall portion B1, even when the regulation belt portion 50 is provided at the end in the opening direction of the first wall portion B1, it is possible to suppress excessive projection thereof from the adjacent second wall portion B2. Furthermore, since the end in the opening direction of the third wall portion B3 at which the belt fastening portion 55 is arranged is lower than the end in the opening direction of the fourth wall portion B4 that is adjacent to the third wall portion B3, even when the belt fastening portion 55 is provided at the end in the opening direction of the third wall portion B3, it is possible to suppress excessive projection thereof from the adjacent fourth wall portion B4.

(4) Since the regulation belt portion 50 regulates movement of the electric wires W to the outside from the opening 34B, at a position that is closer to the bottom wall portion 31B than the cover portion 12 is. That is to say, when attaching the cover portion 12 to the accommodating portion 20, the regulation belt portion 50 regulates movement of the electric wires W to the outside from the opening 34B. Accordingly, it is possible to suppress contact of the electric wires W and the cover portion 12 when attaching the cover portion 12 to the accommodating portion 20. Thus, it is possible to suppress deterioration of the attachment operation efficiency of the cover portion 12.

(5) Since the belt fastening portion 55 is arranged at a position that is away from the lock frame portions 60 as lock portions that fasten the cover portion 12, it is possible to suppress contact of the lock frame portions 60 and the regulation belt portion 50 when fastening the regulation belt portion 50 with the belt fastening portion 55.

(6) The electric wires W are arranged so as to extend through the first accommodating member 21 in which the bottom wall portion 31A is along the horizontal direction, and the second accommodating member 22 in which the bottom wall portion 31B becomes lower with increasing distance from the first accommodating member 21. For example, if the electric wires W have high rigidity due to the electric wires W being thick, for example, that is, if the electric wires W are unlikely to be warped, the electric wires W cannot follow the change from the bottom wall portion 31A of the first accommodating member 21 to the bottom wall portion 31B of the second accommodating member 22, and are likely to be separated from the bottom wall portion 31B of the second accommodating member 22. That is to say, the electric wires W are likely to be positioned near the opening 34B in the second accommodating member 22. That is to say, the electric wires W are likely to project to the outside from the opening 34B in the second accommodating member 22. Thus, if the regulation belt portion 50 and the belt fastening portion 55 are arranged at the side wall portions 32B and 33B of the second accommodating member 22 from which the electric wires W are likely to project, it is possible to regulate the projection of the electric wires.

(7) Since the narrow portion 20a is included in the accommodating portion 20, the electric wires W positioned in the narrow portion 20a are likely to be positioned near the opening 34B compared with the electric wires W positioned in the accommodating portion 20 other than the narrow portion 20a. That is to say, the electric wires W are likely to project to the outside from the opening 34B in the narrow portion 20a. Thus, if the regulation belt portion 50 and the belt fastening portion 55 are arranged at the side wall portions 32B and 33B corresponding to the narrow portion 20a from which the electric wires W are likely to project, it is possible to more reliably regulate the projection of the electric wires W.

(8) Since the regulation belt portion 50 and the belt fastening portion 55 are arranged in the middle in the direction in which the accommodating portion 20 extends, it is possible to reliably regulate the electric wires W accommodated in the accommodating portion 20.

OTHER EMBODIMENTS

Note that the above-described embodiment may be modified and implemented as described below. The embodiment described above and changes thereto can be combined and implemented within a scope that that is technically consistent.

In the foregoing embodiment, the configuration was used in which the regulation belt portion 50 and the belt fastening portion 55 are arranged at the second accommodating member 22, but there is no limitation to this. For example, it is also possible to use a configuration in which the regulation belt portion 50 and the belt fastening portion 55 are arranged at the first accommodating member 21.

In the foregoing embodiment, the configuration was used in which the regulation belt portion 50 and the belt fastening portion 55 are arranged at the side wall portions 32B and 33B corresponding to the narrow portion 20a, but there is no limitation to this. That is to say, it is also possible that the regulation belt portion 50 and the belt fastening portion 55 are arranged at positions other than the narrow portion 20a.

In the foregoing embodiment, the configuration was used in which one protector 10 is provided with one regulation belt portion 50, but there is no limitation to this. For example, it is also possible to use a configuration in which one protector 10 is provided with two or more regulation belt portions 50.

In the foregoing embodiment, the configuration was used in which one regulation belt portion 50 is provided with one belt fastening portion 55, but it is also possible to use a configuration in which one regulation belt portion 50 is provided with a plurality of belt fastening portions 55.

In the foregoing embodiment, the configuration was used in which the belt fastening portion 55 is arranged at a position that is away from the lock frame portions 60, but there is no limitation to this, and it is also possible to use a configuration in which the lock frame portions 60 and the belt fastening portion 55 are adjacent to each other.

In the foregoing embodiment, the configuration was used in which the second accommodating member 22 is inclined with respect to the first accommodating member 21, but there is no limitation to this. It is also possible to use a configuration in which the first accommodating member 21 and the second accommodating member 22 are arranged parallel to each other.

In the foregoing embodiment, the configuration was used in which, in a state in which the protector 10 is attached to a vehicle, the bottom wall portion 31A of the first accommodating member 21 is parallel to the horizontal direction, and the bottom wall portion 31B of the second accommodating member 22 is inclined with respect to the horizontal direction, but there is no limitation to this. For example, it is also possible to use a configuration in which, in a state in which the protector 10 is attached to a vehicle, the bottom wall portion 31B of the second accommodating member 22 is parallel to the horizontal direction, and the bottom wall portion 31A of the first accommodating member 21 is inclined with respect to the horizontal direction. Furthermore, it is also possible to use a configuration in which, in a state in which the protector 10 is attached to a vehicle, the bottom wall portions 31A and 31B are inclined.

In the foregoing embodiment, the configuration was used in which the protector 10 includes the main portion 11 and the cover portion 12, but there is no limitation to this. For example, it is also possible to use a configuration in which the cover portion 12 is omitted.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A protector comprising:
   an accommodating portion including a bottom wall portion, a pair of side wall portions that extend from the bottom wall portion, and an opening that is open in a direction opposing to the bottom wall portion, the accommodating portion being capable of accommodating an electric wire therein;
   a regulation belt portion that is provided as an article integrally molded with one of the pair of side wall portions, and that regulates movement of the electric wire to an outside from the opening; and
   a belt fastening portion that is arranged at another of the pair of side wall portions, and that fastens the regulation belt portion in a state in which the regulation belt portion spans between the pair of side wall portions.

2. The protector according to claim 1, wherein the belt fastening portion fastens the regulation belt portion at one point.

3. The protector according to claim 2,
   wherein the one of the pair of side wall portions includes a first wall portion whose end in an opening direction is provided with the regulation belt portion, and a second wall portion that is adjacent to the first wall portion in a direction in which the accommodating portion extends,
   the other of the pair of side wall portions includes a third wall portion whose end in the opening direction is provided with the belt fastening portion, and a fourth wall portion that is adjacent to the third wall portion in the direction in which the accommodating portion extends,
   the end in the opening direction of the first wall portion is lower than an end in the opening direction of the second wall portion, and
   the end in the opening direction of the third wall portion is lower than an end in the opening direction of the fourth wall portion.

4. The protector according to claim 1, further comprising:
   a cover portion that covers the opening,
   wherein the regulation belt portion regulates movement of the electric wire to the outside from the opening, at a position that is closer to the bottom wall portion than the cover portion is.

5. The protector according to claim 4,
   wherein the accommodating portion includes a lock portion that fastens the cover portion, and
   the belt fastening portion is arranged at a position that is away from the lock portion in a direction in which the accommodating portion extends.

6. The protector according to claim 1,
   wherein the accommodating portion includes a first accommodating member in which the bottom wall portion is along a horizontal direction in a state in which the accommodating portion is attached to a vehicle, and a second accommodating member that is continuous from the first accommodating member, and in which the bottom wall portion thereof is positioned lower than the bottom wall portion of the first accommodating member with increasing distance from the first accommodating member in a state in which the accommodating portion is attached to the vehicle, and
   the regulation belt portion and the belt fastening portion are arranged at the side wall portions of the second accommodating member.

7. The protector according to claim 1,
   wherein the accommodating portion includes a narrow portion in which an accommodation space for accommodating the electric wire is narrower than that of other portions in a direction in which the accommodating portion extends, and
   the regulation belt portion and the belt fastening portion are arranged at the side wall portions corresponding to the narrow portion.

8. The protector according to claim 1, wherein the regulation belt portion and the belt fastening portion are arranged in a middle in a direction in which the accommodating portion extends.

* * * * *